Figure 1:
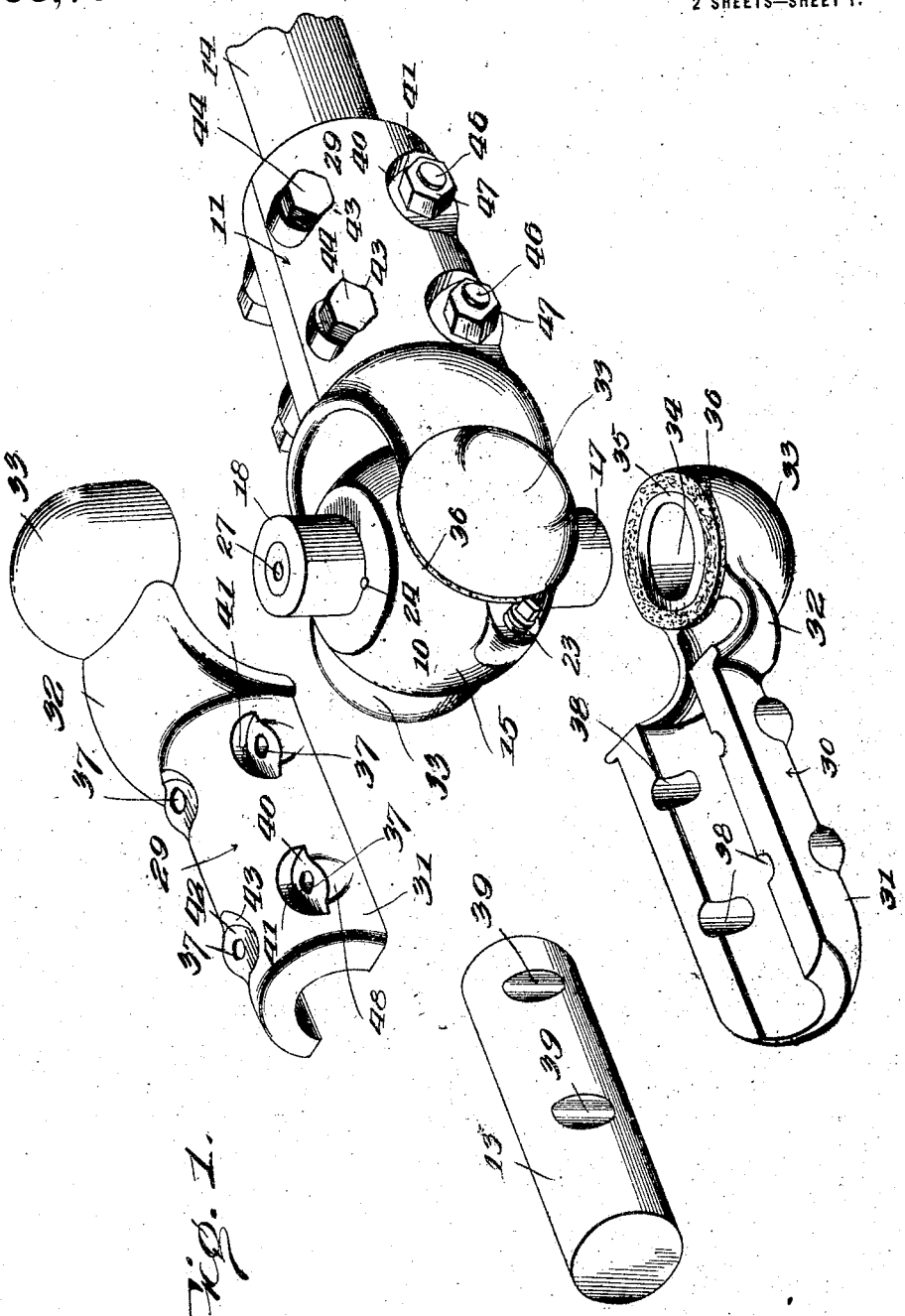

H. F. HOPKINS, DEC'D.
C. HOPKINS, ADMINISTRATRIX.
UNIVERSAL JOINT.
APPLICATION FILED APR. 4, 1914.

1,153,789.

Patented Sept. 14, 1915.
2 SHEETS—SHEET 1.

Witnesses

Inventor
H. F. Hopkins, Deceased.
Clara Hopkins, Administratrix
By
Attorneys

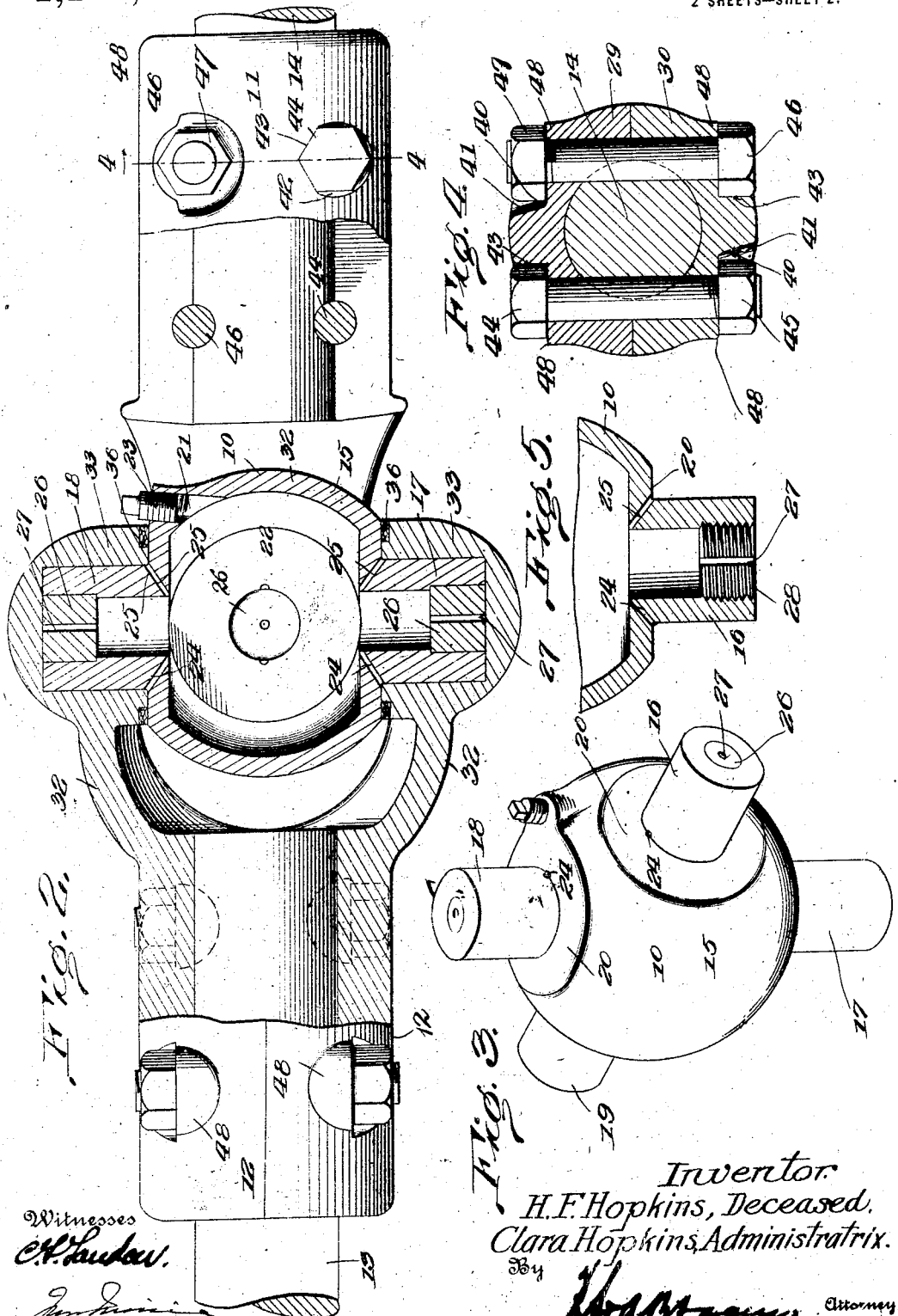

UNITED STATES PATENT OFFICE.

HIRAM F. HOPKINS, DECEASED, LATE OF NORTH GIRARD, PENNSYLVANIA, BY CLARA HOPKINS, ADMINISTRATRIX, OF NORTH GIRARD, PENNSYLVANIA.

UNIVERSAL JOINT.

1,153,789.  Specification of Letters Patent.  Patented Sept. 14, 1915.

Application filed April 4, 1914. Serial No. 329,649.

*To all whom it may concern:*

Be it known that HIRAM F. HOPKINS, deceased, late a citizen of the United States, and resident of North Girard, in the county of Erie and State of Pennsylvania, has invented certain new and useful Improvements in Universal Joints, of which the following is a specification.

This invention relates to new and useful improvements in universal joints, and aims particularly to provide a joint having a hollow globular spider which serves as a lubricant receptacle from which lubricant may be supplied to the sockets of the coupling forks for effecting a constant lubrication of the spider trunnions which are received within these sockets.

An object of equal importance with the foregoing is to provide a universal joint, the forks or coupling members of which include two mating plates designed to receive a terminal of the drive and driven shaft and are held in assembled relation to each other by the same bolts which are employed in holding the shafts against rotation.

A further object is to construct the joint with such regard to proportion, number and arrangement of parts that it may be cheaply manufactured and will be durable and efficient in its action.

The above and additional objects are accomplished by such means as are illustrated in the accompanying drawings, described in the following specification, and then more particularly pointed out in the claims, which are appended hereto and form a part of this application.

With reference to the drawings, wherein there has been illustrated the preferred embodiment of this invention as it is reduced to practice, and throughout the several views of which similar reference numerals designate corresponding parts, Figure 1 is a perspective view showing the several elements of the joint in disassembled relation, but indicating the manner in which they are adapted to be assembled to form an operative joint; Fig. 2 is a plan view of the joint, a portion of the spider and adjacent coupling being shown in section to more clearly disclose the interior construction of the spider; Fig. 3 is a detail perspective view of the spider; Fig. 4 is a section on the line 4—4 of Fig. 2; and Fig. 5 is a longitudinal section taken through one of the spider trunnions and adjacent portion of the spider body member, showing particularly the oil ducts through which a lubricant may pass from the spider body into the sockets of the coupling forks.

The particular embodiment of this invention shown in the drawings includes a spider 10, and a pair of fork couplings 11 and 12, which are pivotally connected to the spider and arranged in planes extending at right angles to each other in the well known manner. These coupling members 11 and 12 are, of course, designed to receive the terminals of the driven and drive shafts 13 and 14 respectively.

The spider consists essentially in a hollow body member 15, which is substantially globular in outline, and is provided with four integral trunnions, individually designated in Fig. 3 by the numerals 16, 17, 18 and 19. The trunnions are cylindrical in shape and are each hollow, as will be observed upon reference to either Figs. 2 or 5. The purpose in thus making the trunnions of the spider hollow will be hereinafter more fully disclosed in that portion of the specification which will be devoted to a description of the coupling forks and their lubrication. The trunnions are, of course, arranged at four quadrantly spaced points, and all lie in the same plane. The face of the body member 15 is flattened at the base or inner terminal of each of the trunnions, as indicated at 20. These circular flattened faces or surfaces are adapted to receive the circular edges of the trunnion receiving sockets of the couplings. At the edge of one of these flattened surfaces there is formed a threaded bore or passage 21 which leads into the lubricant chamber 22, as will be most readily understood upon reference to Fig. 2. A threaded closure plug, indicated at 23, is, of course, provided for the purpose of normally sealing this bore 21 to prevent the escape of lubricant therethrough during the rotation of the spider.

It is now to be observed that there is formed at the junction of each of the trunnions with the body portion of the spider a pair of diametrically opposed diagonally extending oil ducts, as indicated at 24 and 25 in Figs. 2 and 5 particularly. The outer terminals of these oil ducts are preferably located in the side of the trunnions and at a slight distance from the flattened surfaces 20. These oil ducts 24 and 25 of each trunnion are designed to supply lubricant to the sides or cylindrical faces of the trunnions and their receiving sockets.

In order to insure a thorough lubrication of the terminals of the trunnions, there is provided for each of these members a terminal closure plug, the preferred form of which, indicated at 26 in Fig. 3, consists in a metallic plug which is brazed or otherwise fitted in the trunnion. An opening or bore 27 extends through this plug 26, and obviously permits the escape of lubricant from the chamber 22 of the spider body into the sockets of the coupling forks. It has been found desirable in some instances to substitute for the brazed plug 26 of the preferred embodiment a modified form of plug, such as is indicated at 28 in Fig. 5. This modified form of plug is also, of course, formed of metal, but is threaded so that it may be easily inserted in or removed from the trunnion.

As previously set forth, the couplings 11 and 12 are substantially identical in construction, and it is deemed necessary, therefore, to describe only one of them in detail, for which purpose the member 12 of Fig. 1 is chosen. It will be noted upon reference to this figure that the coupling fork consists in a pair of mating arms or plates 29 and 30. These plates 29 and 30 are similar, and each consists in a channel-shaped body member 31, a laterally offset arcuate neck 32, and a terminal semispherical socket 33 formed thereon. It is obvious that the body plates 31 of the fork arms 29 and 30 are adapted to produce, when mated, a cylindrical chamber or passage which may receive the terminal of the driven or drive shaft 13 or 14, as the case may be.

The trunnion receiving sockets 33 are, as stated, semispherical in outline, and are formed with the cylindrical openings or chambers indicated at 34. These chambers 34 are of such diameter that they will snugly receive the trunnions of the spider and are of such depth that the edges 35 of the socket will engage the flattened surfaces 20 of the spider when the trunnions have been positioned within the sockets. It is now to be noted that a circumferential recess is formed in the edge 35 of each socket to receive a washer, such as is indicated at 36.

As has been hereinbefore explained, the same bolts which connect the body plates 31 of the two members 29 and 30 act also to hold the terminals of the shafts 13 or 14, as the case may be, against rotation in the receiving channel or socket formed by the two plates 31. This desirable result is accomplished by forming in each longitudinal edge of each of the plate members 31 a pair of spaced apertures, as indicated at 37. These apertures 37 extend, as shown particularly in Fig. 1, through the edge portions of the plates 31, terminating in the interiorly located grooves 38. The terminal of the shaft 13 is formed with pairs of diametrically opposed spaced grooves 39 which are adapted to register with the interior grooves 38 of the two body plates 31. When the terminal of the shaft 13 is properly positioned in the body plates 31, the pairs of grooves 39 and 38 mate and form continuations of the apertures 37, being equal in diameter to those apertures so that one half of each of the bolts, which are inserted through the various apertures 37, is received within a groove 38, while the other half of each bolt is received within a groove 39. It will thus be obvious, particularly upon reference to Fig. 4, that the bolts which connect the two arms 29 and 30 of the coupling forks serve also to hold the shaft 13 against rotation in the forks.

In order to facilitate the application or removal of the bolts to the members 29 and 30, there has been formed at the outer terminal of the recesses 37, which lie on one side of each plate 31, a recess which, as indicated at 40, is formed with a semi-circular rear wall 41. The apertures 37 of the other side of each plate 31 are formed with somewhat similar recesses 42, but the rear walls 43 of these recesses are shaped to conform to the outline of the hexagonal bolt heads which are preferably employed.

It is now to be noted that the recesses 42 of the arm member 29 are arranged, when the coupling arms are mated, to oppose the recesses 40 of the coupling arm 30. Thus, as is best shown in Fig. 4, the heads 44 of the bolts which connect one side of the coupling are seated in the recesses 42 at the upper portion of the coupling, and the nuts 45 are then threaded on the terminals of the bolts, being disposed in the recesses 40 of the coupling member 30. The heads 46 of the bolts connecting the other side of the coupling forks are inserted from the lower side bearing against the recess wall or shoulder 43, and the nuts 47 are then threaded on these bolts and disposed in the recess 40. It is obvious that by engaging the heads 44 and 46 of the several bolts against the shoulders or recess walls 43, the bolts are held against rotation during the application of the nuts 45 and 47.

It is now to be noted that protuberances or projections, indicated at 48, are formed adjacent each aperture of each body member 31 to provide a relatively wide flat bottom surface for each recess so that the bolt heads or nuts, as the case may be, will be completely received by the recess and will be protected against accidental contact with foreign objects.

Having thus described the actual construction and arrangement of the several parts of the coupling fork 12, it may be well to again explain that the coupling fork 11 is substantially identical in construction to the member 12, and that the same numerals applied to the various parts of the member 12 have been applied to the various parts of the member 11. It will be observed upon reference to Fig. 2 that the sockets of the member 12 receive the trunnions 18 and 17, while the sockets of the fork 11 receive the trunnions 16 and 19.

Relative to the peculiar advantages which have been found to result by employing the particular form of spider hereinbefore described, I desire to direct especial attention to the fact that the oil ducts 24 and 25 serve to conduct a portion of the lubricant from the chamber 22 into the side walls of the sockets 33, while the oil duct 27 of the trunnion closure plugs 26 effect the application of the lubricant to the end walls or inner faces of the sockets. Both the side walls and end walls of each socket are thus thoroughly lubricated during the use of the joint.

In this connection, it may be well to briefly call attention to the fact that the lubricant is forced through the various ducts 25, 26, and 27 of each of the trunnions 16, 17, 18 and 19 by centrifugal force as a result of the rapid rotation of the spider 10. The washers 36, bearing as they do against the flattened portions 20 of the spider body, operate to prevent the excessive leakage of the lubricant.

The universal joint of this invention, is, as will be apparent from the foregoing description, so designed that it may be easily assembled or disassembled, and, is unlike most universal joints now in use, so constructed that it may be removed or re-applied to the main shafts without requiring that the shafts be displaced from their bearings, or disconnected at their opposite terminals. A further meritorious feature of this invention resides in the fact that it includes in its structure no small parts which are liable to breakage through ordinary strains. Again it may be noted that all of the working parts of the joint are so located that access may be readily had to them.

The peculiar location of the bolts which connect the body plates 31 of the shaft receiving sockets insures not only the holding of the shafts against rotation in their sockets, but the sustaining of end thrust and end pulls without danger of the shafts being pushed in or pulled out of the sockets. Furthermore, these bolts which connect the body plates 31 of the members 29 and 30 make it possible to hold a squared terminal shaft in either one of the sockets, should it be desired to provide a connection between shafts of this type.

In reduction to practice, it has been found that the form of this invention illustrated in the drawings, and referred to in the above description as the preferred embodiment, is the most efficient and practical; yet realizing that the conditions concurrent with the adoption of this device will necessarily vary, it is desirable to emphasize the fact that various minor changes in details of construction, proportion and arrangement of parts may be resorted to, when required, without sacrificing any of the advantages of this invention, as defined in the appended claims.

Having thus described the invention, what is claimed as new is:—

1. A universal joint including a spider consisting of a hollow body member adapted to contain a quantity of lubricant and having a threaded bore leading through the wall thereof, a closure plug for the bore, four quadrantly spaced hollow trunnions formed integral with the body member, closure plugs fitted into the outer terminals of the trunnions, said closure plugs having oil ducts adapted to permit the escape of the lubricant from the body member through the terminal of the trunnions, the cylindrical wall of said trunnions being provided with a plurality of diagonally extending lubricant ducts, and a pair of coupling forks having sockets receiving the trunnions, that portion of each socket contacting with the terminal of a trunnion being lubricated by the lubricant issuing from the duct of the trunnion and closure plug, and the portion of each socket in contact with the cylindrical face of each trunnion being lubricated by lubricant issuing from the diagonally extending oil ducts.

2. A universal joint including a spider consisting of a substantially spherical shaped hollow body member adapted to receive a quantity of lubricant, a plurality of trunnions formed integrally with the body member and extending laterally therefrom at quadrantly spaced points, the surface of the body member being flattened to produce a flat annular bearing surface at the base of each trunnion, there being oil ducts formed in the terminals of each trunnion for supplying a lubricant to the end surface of each trunnion, there being diagonally extending oil ducts formed at the juncture of each trunnion with the body member for conducting lubricant to the cylindrical surfaces of the trunnions and onto the annular bearing surfaces of the body member, and a pair of coupling forks having sockets receiving the trunnions.

3. A universal joint including a spider consisting of a hollow substantially spherical body member adapted to contain a quantity of lubricant, a plurality of trunnions formed integrally with the body member, said trunnions being hollow, and a flat annular bearing surface formed on the surface of the body member at the base of each trunnion, there being oil ducts leading from the interior of the body member to a point at the junction of the cylindrical faces of the trunnions and the annular bearing surfaces of the body member, whereby lubricant is supplied to both of said faces, each of said trunnions being provided with an oil duct leading to the end face of the trunnion, coupling forks having sockets receiving the trunnions, each of said sockets being provided with a flat bearing surface adapted to engage against the flat bearing surface at the base of the trunnion, there being an annular groove formed at the outer edge of the flat surfaces of each socket member, and an absorbent ring seated in each groove, the said oil ducts, which supply lubricant to the flat bearing surfaces of the body member, being adapted to supply a lubricant to the absorbent rings of the sockets.

4. A universal joint including a hollow spider adapted to receive a lubricant, a plurality of hollow trunnions carried by the spider and communicating at their inner ends interiorly of the spider, plugs fitting within and closing the outer ends of said trunnions, said plugs having lubricant ducts formed therein communicating interiorly of the trunnions, and a pair of coupling forks having sockets receiving and inclosing the outer terminals of the trunnions and said plugs.

5. A universal joint including a hollow spider adapted to receive a lubricant, a plurality of hollow trunnions carried by the spider and communicating at their inner extremities interiorly of the spider, plugs fitting within and closing the outer ends of the trunnions, said plugs having ducts formed therein communicating interiorly of the trunnions, and a pair of coupling forks having sockets inclosing the outer terminals of the trunnions and said plugs, the adjacent end walls of said plugs providing bearing surfaces engaging within the said sockets.

6. A universal joint including a spider consisting of a hollow body member adapted to receive a quantity of lubricant, and a plurality of hollow trunnions formed integrally with the body member and communicating therewith, plugs closing the outer ends of said trunnions and provided with lubricant ducts extending therethrough, and a pair of coupling forks having sockets inclosing the outer terminals of said trunnions, the said sockets normally seating against the spider and the said trunnions being provided with lubricant ducts in the side walls thereof whereby lubricant will be supplied to the faces of the sockets confronting the spider through said last mentioned ducts.

In testimony whereof I affix my signature in presence of two witnesses.

CLARA HOPKINS, [L. S.]
*Administratrix of the estate of Hiram F. Hopkins, deceased.*

Witnesses:
W. L. SILVERTHON,
Mrs. NANCY T. TAGGART.